(12) United States Patent
Sladecek

(10) Patent No.: US 9,717,364 B2
(45) Date of Patent: Aug. 1, 2017

(54) HEATER

(75) Inventor: Marcel Sladecek, Klagenfurt (AT)

(73) Assignee: Koninklijke Philips N.V., Eindhoven (NL)

(*) Notice: Subject to any disclaimer, the term of this patent is extended or adjusted under 35 U.S.C. 154(b) by 20 days.

(21) Appl. No.: 14/241,471

(22) PCT Filed: Aug. 28, 2012

(86) PCT No.: PCT/IB2012/054400
§ 371 (c)(1),
(2), (4) Date: Mar. 7, 2014

(87) PCT Pub. No.: WO2013/030758
PCT Pub. Date: Mar. 7, 2013

(65) Prior Publication Data
US 2014/0234497 A1 Aug. 21, 2014

Related U.S. Application Data

(60) Provisional application No. 61/529,300, filed on Aug. 31, 2011.

(30) Foreign Application Priority Data

Aug. 31, 2011 (EP) .................................. 11179463

(51) Int. Cl.
*A47J 37/12* (2006.01)
*A47J 27/62* (2006.01)
(Continued)

(52) U.S. Cl.
CPC ............. *A47J 27/62* (2013.01); *A47J 27/004* (2013.01); *A47J 27/14* (2013.01); *A47J 36/16* (2013.01)

(58) Field of Classification Search
CPC .. A47J 36/16; A47J 27/62; A47J 27/14; A47J 27/004; F24C 15/103; F24C 15/105;
(Continued)

(56) References Cited

U.S. PATENT DOCUMENTS 2,046,718 A 7/1936 Bletz
3,190,989 A * 6/1965 Tatsuro ................... A47J 27/62
219/441

(Continued)

FOREIGN PATENT DOCUMENTS

EP 0757529 B1 6/2000
FR 2633482 A1 12/1989
(Continued)

OTHER PUBLICATIONS

Translation of JP2001238794.*

*Primary Examiner* — Dana Ross
*Assistant Examiner* — Brandon Harvey

(57) ABSTRACT

The present application relates to a heater (6) for heating food received in a container (2) to prevent overheating and/or scorching of the food. The heater (6) has a heating element (9) and a control unit configured to initially operate the heating element (9) at a higher initial temperature setting so that, when a container (2) is disposed adjacent to the heating element (9), the temperature of the container is increased rapidly, and to reduce the temperature setting of the heating element (9) to the operating temperature setting when the higher initial temperature setting is reached. The present application also relates to an apparatus for heating food and a method of operating a heater (6) for heating food.

5 Claims, 5 Drawing Sheets

(51) Int. Cl.
*A47J 36/16* (2006.01)
*A47J 27/00* (2006.01)
*A47J 27/14* (2006.01)

(58) Field of Classification Search
CPC ........ F24C 15/107; F24C 15/108; H05B 3/68; H05B 3/681
USPC .......................................................... 99/325
See application file for complete search history.

(56) References Cited

U.S. PATENT DOCUMENTS

| | | | | |
|---|---|---|---|---|
| 3,326,692 | A | * | 6/1967 | Martino ............... A47J 37/1266 219/491 |
| 4,595,827 | A | * | 6/1986 | Hirai ......................... F24C 7/08 177/144 |
| 4,672,540 | A | * | 6/1987 | Waugh ................ A47J 37/1219 219/492 |
| 4,682,012 | A | * | 7/1987 | Wolf ....................... A47J 27/62 219/490 |
| 5,490,449 | A | * | 2/1996 | Meister ............... A47J 37/1266 99/330 |
| 6,084,216 | A | * | 7/2000 | Slegt ................. A47J 27/21083 219/442 |
| 2009/0229474 | A1 | | 9/2009 | Hsu |

FOREIGN PATENT DOCUMENTS

| | | | |
|---|---|---|---|
| GB | 1178841 | A | 1/1970 |
| JP | 0894087 | A | 4/1996 |
| JP | 11123140 | A | 5/1999 |
| JP | 2001238794 | A | 9/2001 |
| JP | 2010282861 | A | 12/2010 |
| WO | 2011002421 | A2 | 1/2011 |

* cited by examiner

HEATER

CROSS-REFERENCE TO PRIOR APPLICATIONS

This application is the U.S. National Phase application under 35 U.S.C. §371 of International Application No. PCT/IB2012/054400, filed on Aug. 28, 2012, which claims the benefit of U.S. Provisional Patent Application No. 61/529,300, filed Aug. 31, 2011 and European Patent Application No. 11179463.2, filed on Aug. 31, 2011. These applications are hereby incorporated by reference herein.

FIELD OF THE INVENTION

The present invention relates to a heater for heating food. The present invention also relates to an apparatus for heating food provided with said heater, and a method of operating a heater for heating food received in a container. This invention also relates to a heating device such as an appliance with a heating element, for example a cooker.

BACKGROUND OF THE INVENTION

It is known from EP0757529B1 to provide a cooking device comprising a container for receiving food which has a heater integrally formed with a base of the container. The integral container and heater are disposed on a main body. The heater is integrally formed with the base of the container so that heat emitted by the heater is directly transmitted to the food in the container. This arrangement results in a short heat up time and cooking time.

In an alternative configuration, the heater is provided separate to the container such that a gap is formed therebetween. The heater is integrally formed with the main body of the cooking device and the container is stood on the heater. However, a disadvantage of this arrangement is that the heat up time and the cooking time are increased due to the indirect transfer of heat emitted from the heater to the food to be cooked disposed in the container.

It is also known that heating devices such as slow cookers, yoghurt makers and other domestic appliances include a heater element, typically electrically driven, with a temperature sensor in intimate thermal contact with the element to detect its operating temperature. The temperature sensor provides a temperature signal as a function of the heater element temperature, and a control processor that is responsive to the temperature signal controls the operational temperature of the heater by controlling an electrical drive current fed to the heater from e.g. a mains supply. The control processor may include a user interface which allows the user to set the desired operating temperature so that the control processor can compare the temperature signal from the temperature sensor with the set temperature and control the heater drive current in a feedback loop.

A problem with this known arrangement is that if the temperature sensor is in an unsatisfactory, non-intimate thermal contact with the heater element, the temperature sensor will under-record the operating temperature of the heater element, which can result in over-heating of the device that could result in a fire, melting of the appliance or the release of poisonous smoke, particularly when the heating device is configured for use over long periods e.g. overnight, such as a slow cooker or a yoghurt maker.

SUMMARY OF THE INVENTION

Therefore, it is an object of the present invention to provide a heater for heating food, an apparatus for heating food, and a method of operating a heater for heating food received in a container, which substantially alleviates or overcomes the problems mentioned above.

Accordingly, the present invention provides heater for heating food received in a container comprising a heating element and a control unit configured to operate the heating element at a predetermined operating temperature setting, wherein the control unit is configured to initially operate the heating element to heat up to a higher initial temperature setting so that, when a container is disposed adjacent to the heating element, the temperature of said container is increased rapidly, and to reduce the temperature setting of the heating element to the operating temperature setting when the higher initial temperature setting is reached.

One advantage of the above arrangement is that the heat up time of the container is minimised without overheating the food disposed in the container.

Advantageously, the control unit is configured to determine the operating temperature setting of the heating element in response to a user input.

An advantage of this arrangement is that the operating temperature setting of the heating element is determined in response to a user's desired food heating temperature setting.

In one embodiment, the control unit may be configured to determine the higher initial temperature setting in response to a user input.

The user input may be a temperature value at which food received in a container is to be cooked.

Conveniently, the heater further comprises a sensor to detect the temperature of the heating element.

Therefore, it is not necessary to detect the temperature of the container, or the food in the container.

Advantageously, the control unit is configured to reduce the temperature setting of the heating element to the operating temperature setting when the higher initial temperature is detected by the sensor.

Therefore, the temperature of the heating element is accurately detected to prevent scorching of food in the container due to overheating.

Therefore, food in the container is indirectly heated by the heater due to the air gap.

According to another aspect of the invention, there is provided a method of operating an apparatus comprising a container and a heater for heating food received in the container, the heater comprising a heating element, and the container being disposed adjacent to but spaced from the heater, the method including the step of initially operating the heating element at a higher initial temperature setting so that the temperature of the container increases rapidly to a container operating temperature, and then reducing the temperature setting of the heating element to a lower predetermined operating temperature setting when the higher initial temperature setting is reached so that the temperature of the container is maintained at its container operating temperature.

The method may further comprise the step of the operating temperature setting of the heating element being determined in response to a user input.

The method may further comprise the step of determining the initial temperature setting in response to a user input.

According to another aspect, the invention provides a heating device comprising a heater element, a temperature sensor to be in thermal contact with and provide a temperature signal as a function of the temperature of the heater element, and a control device configured to compare the temperature signal with a given reference upon the heater element being operated to perform a given change in temperature and in response to provide an indication of the quality of thermal contact between the temperature sensor and the heater element.

Thus, in accordance with the invention, power to the heater element can be shut down when the control device indicates poor thermal contact between the heater element and the sensor which could give rise to overheating.

In one embodiment, the control device is configured to compare the temperature signal that occurs after powering the heater for a predetermined test duration and to compare the temperature indicated by the temperature signal with a predetermined value at the end of said test duration. The control device can be configured to signal an alarm condition if at the end of the predetermined test duration the value of the temperature signal is less than the predetermined value.

The test duration ($D_{test}$) may run from power-up of the heater element so that the testing can be performed when the device is switched on to reduce the risk of overheating during use.

The predetermined test duration can correspond to powering the heater element to reach a threshold temperature which is less than a temperature at which unsafe operation of the heating device will occur, for example less than 100° C.

The invention also includes a method of testing thermal contact between a heater element and a temperature sensor configured to provide a temperature signal as a function of the temperature of the heater element, comprising: causing the heater element to undergo a predetermined change in temperature, comparing the temperature signal with a given reference after the temperature change, and providing an indication of the quality of thermal contact between the sensor and the heater element as a function of the comparison.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
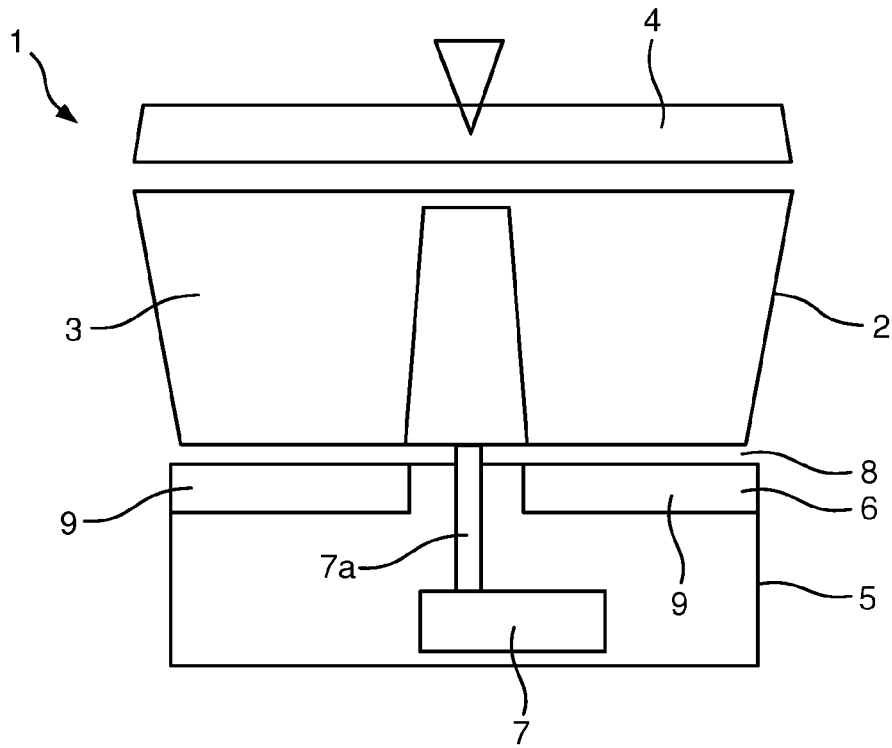
FIG. 1 shows a diagrammatic cross-sectional view of an apparatus for heating food having a container for holding food and a heater.

Referring now to the drawings, in particular FIG. 1, an apparatus for heating food 1 is shown comprising a container 2 provided with a food receiving space 3 and a lid 4. The apparatus 1 further comprises a base unit 5 on which the container 2 stands and a heater 6 that is disposed in the base unit 5. The base unit 5 also has a motor 7 and a rotating shaft 7a driven by the motor 7 to drive stirring elements (not shown) disposed in the container 2. The container 2 is disposed adjacent to, but spaced from, the heater 6 such that a gap 8 is formed between the heater 6 and the container 2. It will be appreciated that food disposed in the food receiving space 3 of the container 2 is indirectly heated by the heater 6 due to the air gap and/or container being disposed therebetween.

The heater 6 comprises a heating element 9, a control unit (not shown) and a sensor (not shown). The heating element 9 is disposed to emit heat when the control unit operates the heating element 9. The control unit is configured to operate the heating element 9 at different temperature settings as illustrated in the graph shown in FIG. 2. In the graph, the upper dashed line shows the temperature setting of the heating element 9 determined by the control unit, and the lower dashed line shows the desired heating temperature of the container 2. The actual temperature trend line of the heating element 9 and the container 2 are denoted 'TH' and 'TC', respectively. The sensor (not shown) is disposed to detect the temperature of the heating element 9.

The control unit is configured to initially set the heating element 9 at a first high temperature setting T1, which is higher than the second desired operating temperature settings T2, T3 of the heating element 9. As a result the control unit supplies power to the heating element 9 so that the temperature of the heating element 9 increases in a general linear manner until the sensor detects that the heating element 9 has reached the initial high temperature T1. Therefore, the heating element 9 and the container 2 heats up rapidly, and the heat up and cooking time is reduced. When the sensor detects that the heating element 9 has reached the initial high temperature setting T1, the control unit stops supplying power to the heating element 9 and changes the temperature setting of the heating element 9 to a lower desired operating temperature. As a result, the temperature of the heating element 9 reduces to the lower desired operating temperature. When the lower desired operating temperature is detected by the sensor the control unit operates the heating element to maintain the desired operating temperature.

The control unit operates the heating element at the desired operating temperature setting by setting an upper operating temperature value T2 and a lower operating temperature value T3 which is marginally lower than the upper operating temperature value T2. The control unit is configured to supply power to the heating element when the lower operating temperature value T3 is detected by the sensor, and to stop supplying power to the heating element when the upper operating temperature value T2 is detected by the sensor. Therefore, the detected temperature of the heating element has hysteresis between the upper and lower operating temperature values T2, T3, and the variation of the operating temperature of the heating element 9 is controlled within a certain temperature range. The upper and lower operating temperature values T2, T3 may be, but are not limited to, being equal. In the case that the upper operating temperature value T2 is equal to the lower operating temperature value T3, the variation of the operating temperature is minimised.

Figure 2:
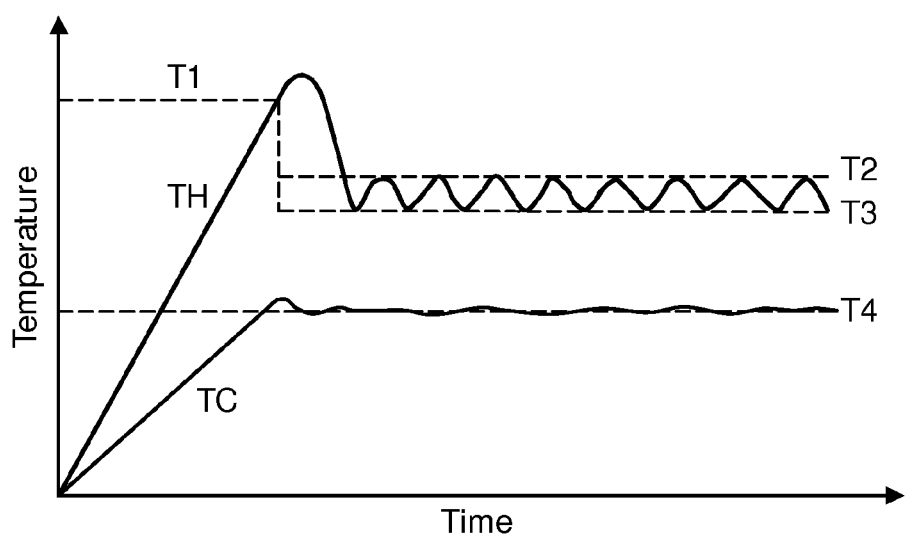
FIG. 2 shows a graph illustrating the general temperature settings of a heater and the resulting heating pattern of the heater (TH) and the container (TC) for holding food.

The corresponding temperature trend of the container 2 as the heating element 9 heats up to its initial high temperature T1 is shown in FIG. 2 by the trend line denoted TC. The desired temperature of the container 2 is shown by the lower dashed line. Due to the indirect heating of the container 2, the operating temperature T4 of the container 2 is lower than the first and second operating temperatures T2, T3 of the heating element 9. However, a linear correlation between the operating temperature T4 of the container 2 and the operating temperatures T2, T3 of the heating element 9 is maintained due to the proximity of the container 2 to the heating element 9.

As the temperature of the heating element 9 increases during its higher initial temperature setting stage, the container 2 rapidly heats up to its corresponding operating temperature T4. The heat emitted by the heating element 9 indirectly heats the food receiving space 3 in the container 2 and the desired temperature of the food receiving space 3 and the container 2 is quickly achieved. Therefore, this adaptation of a simple ON/OFF heating algorithm enables a significant decrease in the heat up time of the food receiving space 3 and the container 2.

When the sensor detects that the heating element 9 has reached the initial high temperature setting T1, the control unit stops supplying power to the heating element 9 and changes the temperature setting of the heating element 9 to a lower desired operating temperature. However, it will be appreciated that the actual temperature of the heating element 9 overshoots the initial high temperature setting before dropping. However, due to the indirect heating of the container 2, the corresponding overshoot of the temperature of the container 2 is minimised. Therefore, any scorching of food due to a higher than desired temperature of the container 2 is prevented. It should be understood that the temperature overshoot of the heating element 9 is configured to be high enough so as to shorten the heat up time, however the temperature overshoot should also be low enough to avoid a significant temperature overshoot of the container 2 which may scorch food held in said container 2. The temperature settings are determined by the control unit referring to a look-up table of values stored by the control unit as will become apparent hereinafter.

It will be appreciated that food held in the food receiving space 3 will absorb and transfer some of the heat supplied to food receiving space 3 by the heating element 9. The stirring elements (not shown) disposed in the food receiving space 3 help to minimise the temperature overshoot by stirring the food received in the food receiving space 3. The stirring elements (not shown) distribute the heat throughout the food receiving space 3. Therefore, during use, rotation of the stirring elements reduces any scorching of food and this can be further controlled by the control unit controlling the speed of rotation of the stirring elements as the speed of rotation of the stirring elements will affect the rate at which the heat is distributed and dissipated in the food receiving space.

In the present embodiment the control unit operates the stirring elements to rotate at a constant speed when the apparatus is operated so that the number of parameters affecting the operating temperature of the container and the food receiving space are minimised, and the temperature of the container and food receiving space are simply controlled.

The control unit is configured to determine the initial high temperature setting T1, and the second desired operating temperature setting T2, T3 of the heating element 9 based on the desired operating temperature T4 of the container 2. The control unit refers to a stored set of pre-determined values for T1, T2 and T3 which correspond to specific operating temperatures T4. An example of operating temperatures T4 and their corresponding initial high temperature setting T1, and second temperature setting T2 of the heating element is shown in the table below.

| T4 [° C.] | T1 [° C.] | T2 [° C.] |
| --- | --- | --- |
| 40 | 60 | 47 |
| 70 | 105 | 83 |
| 90 | 132 | 108 |
| 110 | 164 | 135 |
| 130 | 192 | 162 |
| 175 | 230 | 228 |
| 230 | 230 | 235 |

Therefore, in use, a user is required to input the control unit with the desired operating temperature T4 of the container only, and the control unit is configured to determine the necessary temperature settings T1, T2, and T3 based on a predetermined set of values retained by the control unit.

It will be appreciated that in the present embodiment the final temperature of the food receiving space 3 and the container 2 increases linearly with the increase in temperature of the heating element 9 due to the selected temperature range and the configuration of the apparatus which minimises energy loss due to radiation or convention.

Furthermore, although not shown in FIG. 2 it should be understood that there is an additional temperature difference between the container 2 and the food receiving space 3. The operating temperature of the food receiving space 3 will be marginally lower than the operating temperature T4 of the container 2, although the temperature trend of the food receiving space 3 will closely follow the temperature trend TC of the container 2.

Operation of the apparatus for heating food will now be described. A user selects and input a desired operating temperature T4 of the container 2, for example 40° C., using a user controlled input (not shown). The control unit determines the operating temperature settings T1, T2 and T3. The control unit then supplies power to the heating element 9 to heat the heating element and the food receiving space 3 in the container 2 is rapidly heated up until the sensor detects that the heating element has reached the initial high temperature setting T1, for example at 60° C. The control unit then stops supplying power to the heating element and changes the temperature setting of the heating element 9 to the lower operating temperature T2, T3, for example 47° C. Therefore, the overshoot of the temperature in the food receiving space 3 and the container 2 is minimised, and food contained therein does not scorch. The control unit then maintains the operating temperature T4 of the container 2 by controlling the heating element.

Although in the above arrangement the food in the food receiving space is indirectly heated due to the base of the container and an air gap being disposed between the food in the food receiving space and the heating element, it will be appreciated that the arrangement is not limited thereto and that, for example, the indirect heating of the food may be determined by the heater having a cover, and/or the low thermal conductivity of the container alone, when the container is placed directly on the heater.

Another aspect will now be described with reference to FIGS. 3 to 7.

Figure 3:
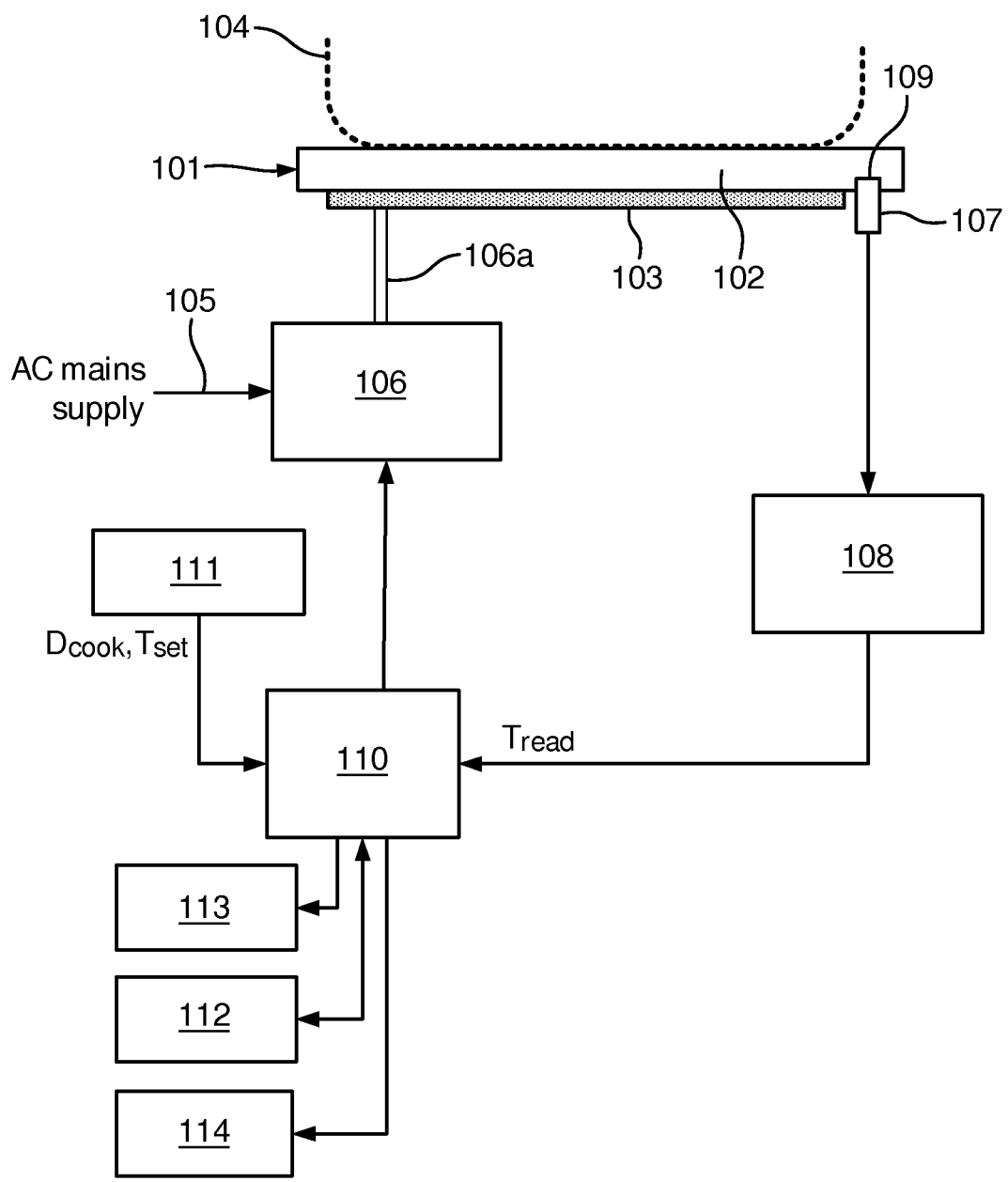
FIG. 3 is a schematic block diagram of a heating device.

Referring to FIG. 3, a heating device in the form of an electrical cooking appliance includes a heater element 101 that comprises a metal plate 102 with an associated electrical heating coil 103. The plate 102 may be disk shaped and configured to receive a cooking vessel 104 on its upper surface as illustrated in dotted outline. The heater coil 103 is in this example driven from a domestic AC electrical supply 105 that is fed to a heater driver circuit 106 which controls the on period of the AC supply fed through cable 106a to the heater coil 103, so as to permit control of its operating temperature.

The operating temperature of the heater element 101 is detected by a temperature sensor 107 which conveniently comprises a thermistor for example a PTC, NTC, PT100 or the like. However, other temperature sensors could be used such as a thermocouple, thermostat, or a thermal elongation sensor. The sensor 107 is driven by a sensor driver and a control circuit 108 which derives an electrical signal T as a function of the sensor temperature of the heater element 101.

The thermistor in the sensor 107 is conveniently received within a thermally conductive housing e.g. made of ceramics material or for example metal, received in intimate contact with the heater plate 102 within a recess 109 formed in its underside.

Control processor 110 conveniently comprises a microprocessor which repeatedly samples the signal T from the sensor electronics 108 to derive a sampled signal $T_{read}$ as a function of the sensor temperature over time. The control processor 110 also receives a set temperature $T_{set}$ from a user interface 111. The control processor 110 thus controls the duty cycle of the heater driver circuit 106 to maintain the sampled temperature $T_{read}$ towards equality with $T_{set}$ in a feedback loop. The control processor 110 has an associated program memory 112 which stores programs for controlling the heater element 101 to perform different heating routines for different cooking recipes at selectable different temperatures $T_{set}$. The user interface 111 also allows the cooking duration $D_{cook}$ to be set by a user to control the duration of cooking performed by the device.

The control processor 110 has an associated program memory 112, a non-volatile memory 113 such as an EEPROM for storing data and an error display 114 such as a warning light for indicating an error condition.

The program memory 112 includes a program for checking that the sensor 107 is in intimate thermal contact with the heater element i.e. intimately received within the recess 109 of the heater plate 102. The program can conveniently be run at start up of the device so as to avoid overheating due to bad thermal contact of the sensor 107 with plate 102. The program is configured to check the rate at which the sensed temperature $T_{read}$ increases during a test duration $D_{test}$ following power-up of the heater element 103. If the thermal contact of sensor 107 with plate 102 is poor, the sensor 107 will under-report the actual temperature of the heater element 101. This can be seen from the graphs of FIGS. 4 and 5.

Figure 4:
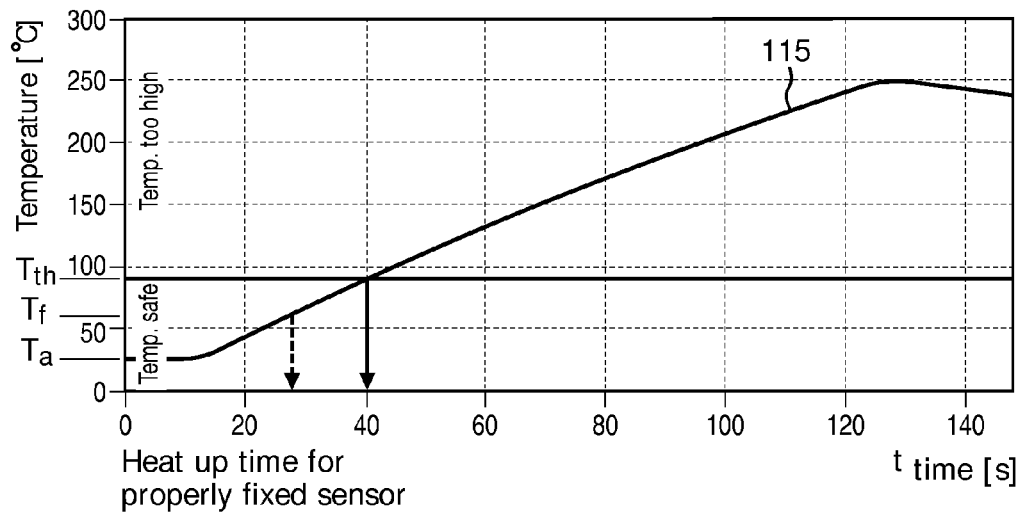
FIG. 4 is a graph of the temperature signal produced by a temperature sensor shown in FIG. 3 over time when the sensor is in good, intimate thermal contact with the heater element i.e. correctly fixed in place.

FIG. 4 illustrates the rise in temperature of the heater element 101 following start up of the heater element 101. At time t=0, the heater element 101 is at ambient temperature $T_a$ and when power is initially switched on to the heater element 101, its temperature increases over time as illustrated by curve 115. In the example shown in FIG. 4, the element 101 reaches a functional temperature $T_f$=60° C. after a time t=28 seconds. Also, it can be seen from the graph of FIG. 4 that the temperature of element 101 reaches a threshold temperature $T_{th}$ at time t=40 seconds at which the safety of the apparatus is comprised. In the example shown in FIG. 3, the threshold temperature $T_{th}$ may be equal to 90° C. i.e. just below the boiling point of water i.e. 100° C.

In the graph of FIG. 4, the values of temperature are accurately sampled in the data $T_{read}$ from the sensor 107 since the sensor is in good thermal contact with the heater element 101. However, if the sensor 107 is in bad thermal contact, the values of $T_{read}$ under-report the actual temperature as illustrated by curve 116 in FIG. 5. Here, the functional temperature $T_f$ as reported by the values of $T_{read}$ is not reached until time t=64 seconds, at which time the true temperature T of the heater element 101 has reached 150° C. which is significantly above the safe threshold temperature $T_{th}$ as illustrated by curve 115 for the actual temperature, which could result in dangerous overheating of the device.

To avoid such overheating, the control processor 110 runs the program held in memory 112 to check the quality of data provided by the sensor 107. One example of the routine is illustrated in FIG. 6.

The process starts at step S4.1 at which time the controller 110 commands the heater driver 106 to apply mains power through cable 106a to the heater element 101 on a full duty cycle for a test period $D_{test}$. In this example, a period $D_{test}$ corresponds to the time taken for the heater element 101 to reach a predetermined test temperature $T_{test}$. In this example, the value of test temperature $T_{test}$ may correspond to the threshold temperature $T_{th}$ for the heater element 101 above which unsafe operation may occur. However, the value of $T_{test}$ may be selected to be some other value less than $T_{th}$, by suitably adjusting the duration of test period $D_{test}$. Thus, in the example illustrated in FIGS. 4 and 5, the test period $D_{test}$ corresponds to 40 seconds. If an intimate thermal contact is established between the sensor 107 and the plate 102, the value of $T_{read}$ at the end of the test period $D_{test}$=40 seconds will exceed the temperature $T_{test}$=60° C. in this example as illustrated by curve 115 in FIG. 5.

However, if poor thermal contact occurs between the sensor 107 and plate 102, the value of $T_{read}$ at the end of $D_{test}$ will be represented by curve 116 and will be less than the value of $T_{test}$.

Figure 6:
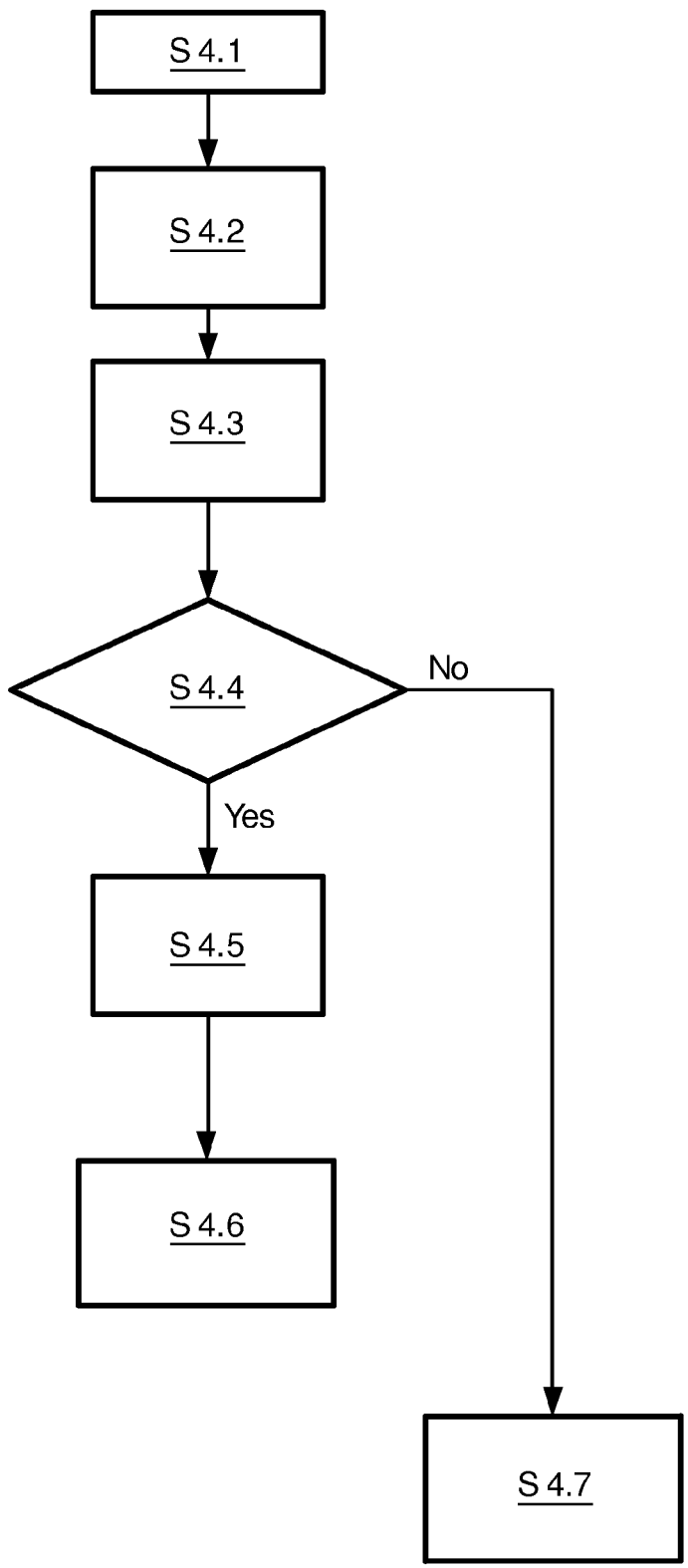
FIG. 6 is a flow diagram of a process performed by the control processor to determine the quality of thermal contact between the temperature sensor and the heater element.

At step S4.4 as shown in FIG. 6, the value of $T_{read}$ at the end of the period $D_{test}$ is compared with the reference value corresponding to $T_{test}$. In this example the value of $T_{test}$ corresponds to the functional temperature $T_f$ for convenience but this need not be the case and $T_{test}$ can be selected independently of $T_f$.

Figure 5:
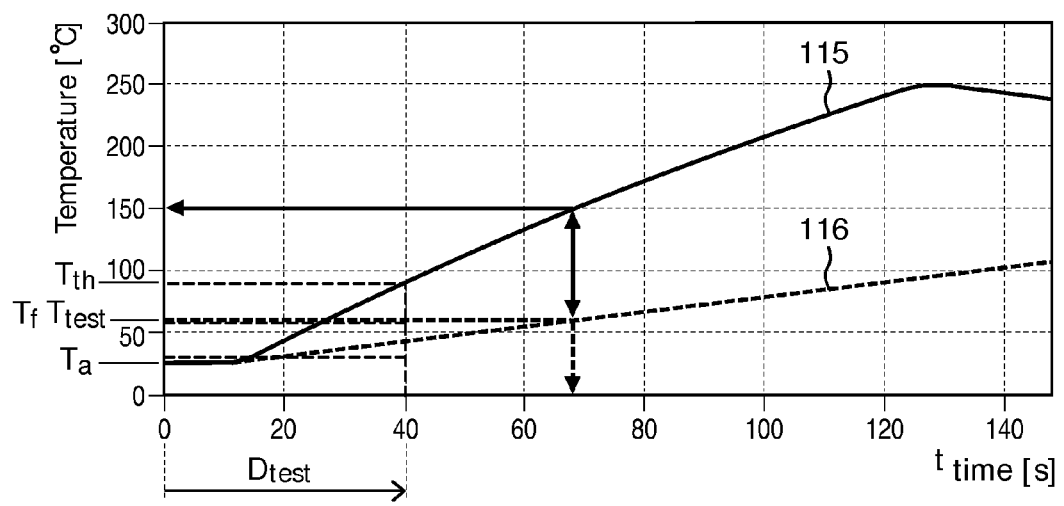
FIG. 5 corresponds to FIG. 4 in a situation where the temperature sensor is badly fixed in place, i.e. in poor thermal contact with the heater element.

If the value of $T_{read}$ is less than $T_{test}$, this indicates that the sensed temperature is following curve 116 shown in FIG. 5 and is indicative of poor thermal contact between the sensor 107 and the heater element 101, as indicated at step S4.5.

The routine may be run during an initial power-up of the device during manufacture as part of a quality control procedure for checking that the manufactured device is fully operational. Further quality checks of other operational aspects of the device may be disabled at step S4.6 in response to the fault condition indicated at step S4.5. The fault condition may be recorded in EEPROM 113 illustrated in FIG. 3 and also an error display may be provided by display 114.

However, if the test performed at step S4.4 indicates that $T_{read}$ is greater than $T_{test}$, this indicates that the value of $T_{read}$ is changing generally as illustrated in curve 115 of FIG. 5, corresponding to good, intimate thermal contact between the sensor 107 and the heater plate 102 and so the device is considered to have passed the test so that it is worthwhile performing further quality control checks for the device as shown at step S4.7.

Figure 7:
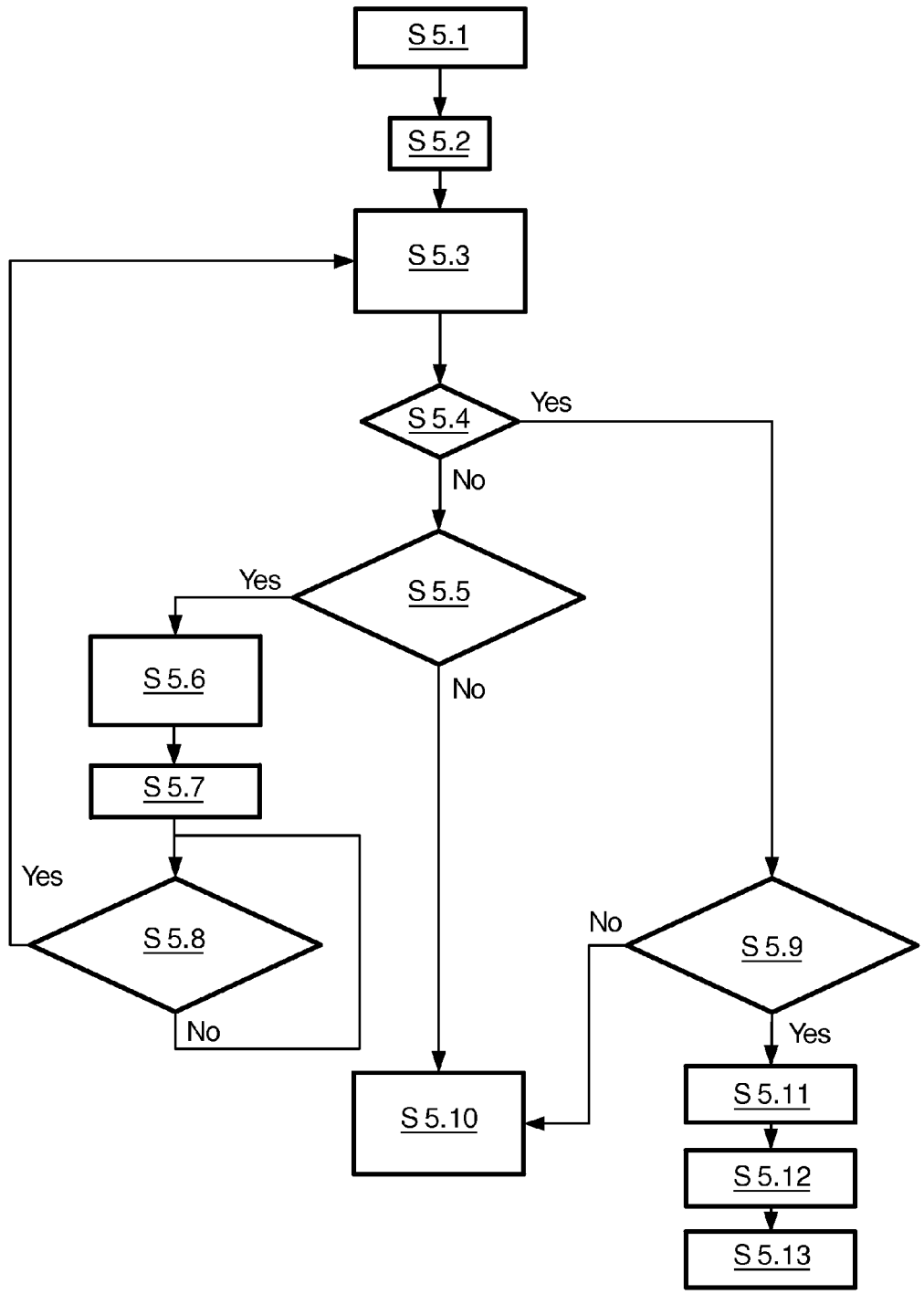
FIG. 7 is a flow diagram of another process to be performed by the processor to determine the quality of thermal contact.

As previously explained, the process illustrated in FIG. 6 may be carried out as a quality control procedure at the time of manufacture of the heating device. Another version of the program held in program memory 112 is illustrated in FIG. 7 may be run during normal use of the device at start up.

The process starts at step S5.1 and the control parameter N is initialized at step S5.2. At step S5.3, the controller 110 samples the sensor temperature reading $T_{read}$.

Then, having checked at step S5.4 that the parameter N is initialized, the process checks at step S5.5 whether the sample value of $T_{read}$ is less than a relatively low start temperature $T_{start}$ which for example may correspond to the initial ambient temperature $T_a$ shown in FIG. 4. In this way, it can be determined whether the device has cooled down sufficiently from a previous use for the program to be run successfully and check the change of temperature that occurs at power-up of the device.

If $T_{read}$ is less than $T_{start}$, a timer is started at step S5.6 and run for a period corresponding to the duration $D_{test}$. Also, the control parameter N is set to value 1 at step S5.7.

At step S5.8, a check is carried out to determine if the timer has timed out. When this occurs, the process reverts to step S5.3 and a further a reading of $T_{read}$ is taken by the processor 110. At this point, N>0 and so the process moves to step S5.9 which corresponds to step S4.4 in FIG. 7 to determine whether the value of $T_{read}$ is less than the temperature $T_{test}$ at the end of the test period $D_{test}$. If the temperature $T_{read}$ exceeds the value $T_{test}$, the normal feedback loop control process previously described with reference to FIG. 3 is carried out to control the operating temperature of the heater element 101 during cooking, as illustrated at step S5.10.

However, if the value of $T_{read}$ tested at step S5.9 does not exceed the temperature $T_{test}$, a bad thermal contact has developed between the sensor 107 and heater element 101 so an alarm is provided at step S5.11 on display 114 shown in FIG. 3 and also an error message is written into the EEPROM 113 at step S5.12. At this point, the control processor instructs a heater driver 106 to disconnect the main supply 105 from the heater element in order to avoid overheating. The processor 110 may not permit power to be restored to the heater element 101 until a service engineer has repaired the device and cancelled the error message stored in EEPROM 113.

Many modifications and variations of the described system can be evident to those skilled in the art and it will understood that the particular temperatures given in the foregoing example may be altered from the values stated hereinbefore.

Also, it will be understood that in the foregoing examples the rate at which the temperature signal $T_{read}$ varies as the heater element is energised is measured between two fixed points in time, namely the time at which the device is powered up and the end of the test period $D_{test}$. However, those skilled in the art will appreciate that other methods of determining the change can be used. For example the slope of the graph shown in FIGS. 4 and 5 can be can be measured, for example by the use of multiple test sampling points over time at which the temperatures are measured successively.

Also, the test could be performed during a period when the heater element cools down rather than during initial heating. Many other modifications and variations will be evident to those skilled in the art.

Aspects:

1. A heating device comprising:
a heater element (101),
a temperature sensor (107) to be in thermal contact with and provide a temperature signal ($T_{read}$) as a function of the temperature of the heater element, and
a control device (110) configured to compare the temperature signal ($T_{read}$) with a given reference ($T_{test}$) upon the heater element being operated to perform a given change in temperature, and in response to provide an indication of the quality of thermal contact between the temperature sensor and the heater element.

2. A heating device according to aspect 1 wherein the control device (110) is configured to compare the temperature signal that occurs after powering the heater element (101) for a predetermined test duration ($D_{test}$) and to compare the temperature indicated by the temperature signal with a predetermined value ($T_{test}$) at the end of said test duration.

3. A heating device according to aspect 2 wherein the control device (110) is configured to signal an alarm condition if at the end of the predetermined test duration the value of the temperature signal is less than the predetermined value ($T_{test}$).

4. A heating device according to aspects 2 or 3 wherein control device (110) is configured to provide the test duration ($D_{test}$) from power-up of the heater element (101).

5. A heating device according to aspects 2, 3 or 4 wherein the predetermined duration ($D_{test}$) corresponds to powering the heater element (101) to reach a threshold temperature ($T_{th}$) which is less than a temperature at which unsafe operation of the heating device will occur.

6. A heating device according to aspect 5 wherein the threshold temperature is less than 100° C.

7. A heating device according to any preceding aspect wherein the control device includes an electrical processor (110).

8. A heating device according to any preceding aspect wherein the heater element (101) is electrically driven and the control device (110) is operable to control electrical heating power supplied to the heater element as a function of the temperature signal ($T_{read}$) so as to tend to cause the temperature of the heater element to be maintained at a set temperature ($T_{set}$).

9. A heating device according to aspect 8 including a heater driver (106) operable to control the duty cycle of an electrical alternating current supply supplied to the heater element (101).

10. An electrical appliance including a heating device according to any preceding aspect.

11. A method of testing thermal contact between a heater element (101) and a temperature sensor (107) configured to provide a temperature signal ($T_{read}$) as a function of the temperature of the heater element, comprising:
causing the heater element to underdo a predetermined change in temperature, comparing the temperature signal ($T_{read}$) with a given reference ($T_{test}$) after the temperature change, and
providing an indication of the quality of thermal contact between the sensor and the heater element as a function of the comparison.

12. A method according to aspect 11 performed during a quality checking procedure on manufacture of the device, including disabling predetermined quality control checks in the event that the thermal contact is indicated to be in adequate.

13. A computer program to be run by a processor to test thermal contact between a heater element (101) and a temperature sensor (107) configured to provide a temperature signal ($T_{read}$) as a function of the temperature of the heater element, the program when run by the processor being operative to:
cause the heater element to underdo a predetermined change in temperature, compare the temperature signal ($T_{read}$) with a given reference ($T_{test}$) after the temperature change, and provide an indication of the quality of thermal contact between the sensor and the heater element as a function of the comparison.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claims in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. An apparatus for heating food comprising:
   a container;
   a base unit on which the container is placed, the base unit including a motor and a rotatable shaft driven by the motor;
   a heater disposed in the base unit and including a heating element for heating food disposed in the container;
   a temperature sensor disposed for sensing a temperature of the heating element; and
   a control unit adapted to operate the heating element at a set operating temperature in response to the temperature sensed by the temperature sensor;
   said container being arranged adjacent to but spaced from the heating element via the rotatable shaft such that the container is thermally coupled to the heating element via an air gap for, in operation, effecting a predetermined temperature difference between a higher first temperature of the heating element and a lower second temperature of the container in response to being heated via the heating element;
   said control unit being adapted to effect heating of the heating element to an initial first temperature that is higher than the set operating temperature so that a temperature of the container is increased rapidly to an initial second temperature that is below a predetermined temperature that could damage food disposed in the container, and responsive to the heating element being heated to the initial first temperature, the control unit being further adapted to effect heating of the heating element to then reduce the initial first temperature of the heating element to the set operating temperature.

2. An apparatus according to claim 1 where the control unit is adapted to determine a setting of the set operating temperature of the heating element in response to a user input.

3. An apparatus according to claim 1 where the control unit is adapted to determine a setting of the initial first temperature in response to a user input.

4. An apparatus according to claim 2 where the user input is a temperature value at which food received in the container is to be cooked.

5. An apparatus according to claim 1 where the control unit is adapted to reduce a temperature setting of the heating element to the set operating temperature when the initial first temperature is detected by the sensor.

* * * * *